United States Patent [19]
Beatty

[11] Patent Number: 5,551,332
[45] Date of Patent: Sep. 3, 1996

[54] BARBECUE WITH SUPPORT STAND FOR SMOKE PLATES

[76] Inventor: Theodore J. Beatty, 110B Valley Oaks Dr., Visalia, Calif. 93292

[21] Appl. No.: 518,193

[22] Filed: Aug. 23, 1995

[51] Int. Cl.$^6$ .............................. A47J 37/00; A47J 37/07
[52] U.S. Cl. ........................ 99/446; 99/447; 99/400; 99/407; 99/482; 126/41 R; 126/25 R
[58] Field of Search ............................ 99/401, 400, 447, 99/446, 449, 482, 444, 445; 126/214 D, 9 R, 25 R, 41 R

[56] References Cited

U.S. PATENT DOCUMENTS

| | | | |
|---|---|---|---|
| 4,627,408 | 12/1986 | Schlosser | 126/41 R |
| 4,683,867 | 8/1987 | Beatty | 126/41 |
| 4,823,684 | 4/1989 | Traeger et al. | 99/482 X |
| 5,279,277 | 1/1994 | Barker | 126/41 R |
| 5,473,980 | 12/1995 | Carpenter | 99/400 |

*Primary Examiner*—David Scherbel
*Assistant Examiner*—Reginald L. Alexander
*Attorney, Agent, or Firm*—David Pressman

[57] ABSTRACT

For use in a gas barbecue, a pair of smoke generating plates (18L and 18R) are mounted in an anticline arrangement between the gas burner (12) and the cooking grid. Drippings from the food will be vaporized into smoke upon falling onto the hot plates, thereby generating smoke which envelops and penetrates the food on the grill, imparting to it a desirable smoky flavor. The plates are mounted upon a bent wire stand (20) which rests upon the floor of the barbecue and extends around and over the burner. The stand has a center peak (20C) over the burner and shoulders at the sides so as to support the plates in the anticline arrangement.

20 Claims, 1 Drawing Sheet

BARBECUE WITH SUPPORT STAND FOR SMOKE PLATES

BACKGROUND

1. Cross-Reference to Related Case

This invention is an improvement of the barbecue of my U.S. Pat. No. 4,683,867, granted 1987 Aug 4.

2) Field of Invention

This invention relates generally to barbecues, specifically to an arrangement of plates used in a barbecue for catching food drippings and generating smoke.

3) Prior Art

In gas-fired barbecues, a gas burner is mounted below a cooking grid (also known as a food-holding grill or grate) for creating a flame under and thereby cooking food on such grid.

Cooks and designers have found that the flavor of such food can be enhanced by causing smoke to envelop and thereby penetrate such food. One way to generate such smoke is to position rocks over the burner and below the cooking grid. The rocks, preferably lava rocks, are placed upon a rock grate mounted over the burner and below the grid. Drippings from food fall onto the rocks, which, being very hot, vaporize such drippings to create smoke which rises and envelops the food, causing it to have a desirable smoky flavor.

However this arrangement has a serious drawback since such drippings can fall between the rocks, or flow around such rocks, onto the burner and its flame. As a result, the drippings, which are fatty and hence combustible, can ignite and cause a flareup and possibly a dangerous fire, injuring users of the barbecue and causing property damage.

In my above patent, I introduced refractory plates that eliminate such flareups and uneven cooking. These plates were positioned between the burner and the cooking grid; they caught and thereby prevented the drippings from reaching the burner. Specifically, a pair of plates were mounted between the burner and the grill in an anticline or tentlike arrangement. The plates were mounted so that their inner, upper edges overlapped slightly and the plates sloped down and away on both sides of a high centerline crest over the burner.

In operation, drippings from food on the cooking grid fell onto the sloping plates, which were hot, and thereby created smoke which rose and enveloped the food above. Also the plates prevented the drippings from reaching the burner flame. As stated in my patent, any drippings which didn't vaporize promptly flowed down the plates to their outer edges. An outer section of each plate was bent up to catch the drippings. Since the bent-up sections were located away from the intense heat in the center part of the barbecue, the latter drippings did not flare up or catch fire.

My above patent discloses several arrangements for mounting the sloping plates over the burner of a barbecue.

In one arrangement, as shown in FIGS. 1 to 4 of the patent, the plates rested on bolts mounted in the ends of the barbecue housing and tabs which extended out from the sides of the housing. This mounting arrangement was undesirable since it was relatively complex and was difficult to assemble and disassemble for cleaning.

In another arrangement, as shown in FIGS. 8 and 9 of the patent, the plates were mounted over the rock grate by means of spacing cylinders positioned on the rock grate and between the overlapping plates. In another arrangement, not specifically shown in the patent, but in commercial use, the plates were positioned, with a slight overlap, on a support angular member which was positioned on the rock grate.

While the above two arrangements operate well, they cannot be used with many barbecues sold today since manufacturers have redesigned such barbecues so that they no longer employ any rock grate. They removed the rock grate because the rocks became contaminated and messy and were difficult to clean. Instead the barbecues employed metal devices which the manufacturers claimed generated smoke and distributed the heat more evenly. However all of these devices provided routes for the juices and fats from the food to reach the burner below and hence did not prevent flareups. My plates cannot be used in these barbecues since they do not have a surface for supporting such plates. My plates could not be mounted directly upon the burner with the aforementioned support angular member since the plates would interfere with the flames, since burners in different barbecues have different shapes and sizes, and since there would be no support for the outer, lower sides of the plates.

OBJECTS AND ADVANTAGES

Accordingly, several objects and advantages of the invention are to provide an improved way to generate smoke in a barbecue grill, to provide a sloping smoke generating plate arrangement for a barbecue which is improved in design and operation, which is not susceptible to flareup, and which can be mounted in a barbecue which does not have any rock grate.

Other objects are to provide a smoke generating plate arrangement for a barbecue which is simple in construction, easy to assemble, disassemble, and clean, and which is reliable in operation and use.

Further objects and advantages will become apparent from a consideration of the ensuing description and the accompanying drawings.

DRAWING FIGURES

DRAWING REFERENCE NUMERALS

10 barbecue housing
10S sides of 10
10F floor of 10
12 burner
14 pipe
16 cooking grid
18L, 18R smoke-generating plates
18B bent section
20 stand
20L bottom, long section
20U upwardly extending sections
20H horizontal sections
20C upwardly pointed center portion
20D downwardly extending sections
20E end sections

SUMMARY

In accordance with the invention, a pair of sloping, smoke-generating plates are mounted above a burner and below a cooking grid in a gas-fired barbecue by means of a supporting stand. The stand, preferably made of rigid wire, extends from the floor of the barbecue, up around the sides of the burner, and to a peak over the center of the burner so as to be able to support the plates in an anticline position. The stand may also be made of metal strips and/or any other heat-resisting material.

DESCRIPTION—FIGS. 1 TO 3

Figure 1:
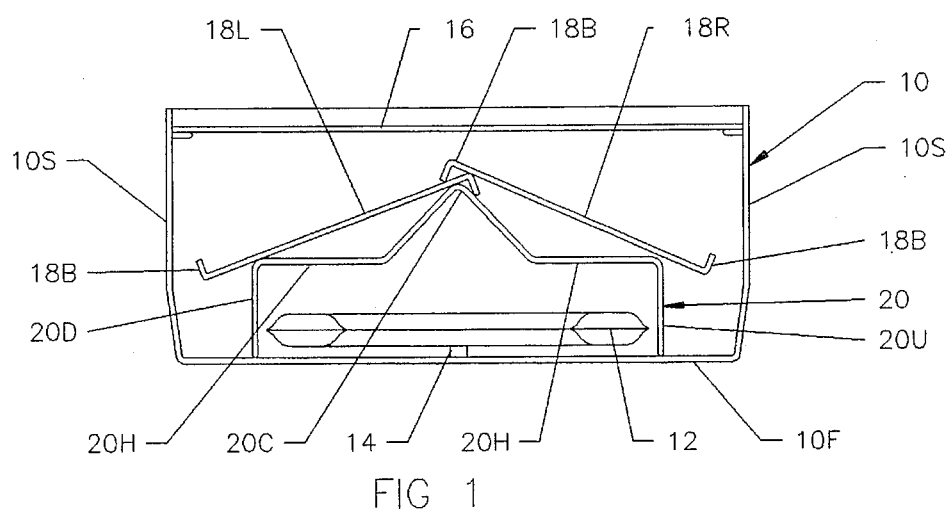
FIG. 1 is an elevational end view of a gas-fired barbecue with a burner, a cooking grid, and a pair of sloping smoke generating plates and a novel mounting stand therefor in accordance with the invention.

As shown in FIG. 1, a conventional barbecue comprises a housing 10 having sides 10S and a floor 10F. Housing 10 is supported by a conventional stand (not shown) at table height. The barbecue also includes a conventional H-shaped gas burner 12 (better shown in FIG. 3) which has a multitude of tiny gas outlet holes (not shown) around its periphery, usually on the underside of the burner. Combustible gas, such as propane, is supplied from a supply tank or other source (not shown) to burner 12 via a pipe 14 (FIG. 1) on the underside of the burner. The burner has a predetermined height. The barbecue also has a cooking grid 16 at the top of the housing and spaced above burner 12.

Figure 2:
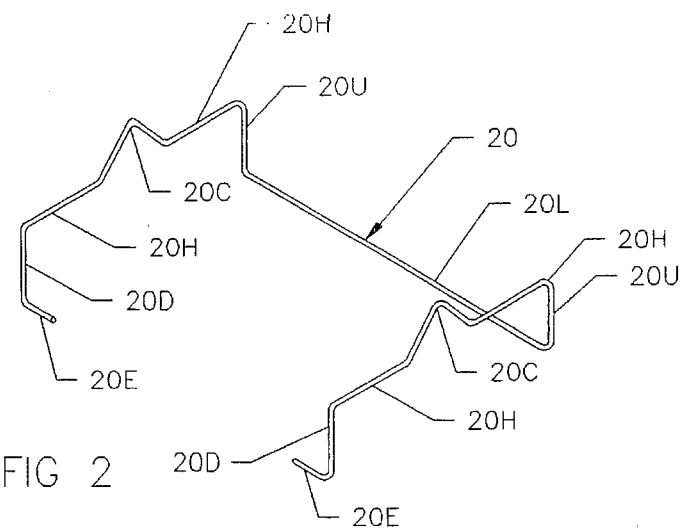
FIG. 2 is an isometric view of the stand of FIG. 1 in accordance with the invention.
Figure 3:
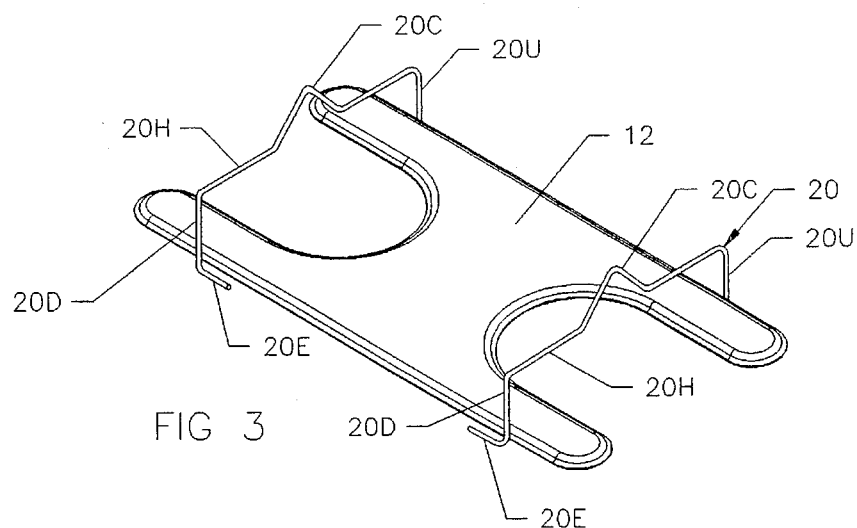
FIG. 3 is an isometric view of the stand and burner of FIG. 1 in accordance with the invention.

In accordance with the invention, a pair of sloping, smoke-generating rectangular plates 18L (left) and 18R (right), similar to those shown in my above patent, are mounted above burner 12 by means of a wire stand 20, better shown in FIGS. 2 and 3.

In one preferred embodiment, each plate 18 (FIG. 1) is made of sheet iron about 1.6 mm thick, 53 cm long, and 15 cm wide after bending. Each longitudinal edge has an integral, bent section 18B (1 cm wide) extending normally to the main portion of the plate; the bent section of each plate extends in opposite directions from the main section. The plates are arranged in an anticline configuration and overlap at the crest, with the bent sections (extending down) partially nesting together. The opposite bent sections of each plate are bent upwardly to form a trough at the outer and lower longitudinal edge of each plate.

Stand 20 is made of steel wire, about 6.5 mm thick, and 116 cm long before bending. As shown in FIG. 2, stand 20 comprises a bottom, long straight base portion or section 20L about 20.3 cm long. Extending respectively from the opposite ends of base section 20L on one side of the burner are a pair of upwardly extending leg sections 20U (about 7.6 cm high).

Extending horizontally and respectively from the upper ends of leg sections 20U are a pair of horizontal support sections 20H. Each support section 20H forms a corner, shoulder, or projection portion with its respective upwardly supporting section 20U and includes two straight portions (each about 7.6 cm long) sandwiching an upwardly pointed center projecting portion 20C. Center portion 20C extends up about 5 cm from the straight portions of section 20H and is about 7.6 cm wide.

Extending respectively downward from the left ends of sections 20H on the opposite side of the burner are an additional pair of leg sections 20D which terminate at the same floor level as section 20L. Finally, extending inwardly from the lower ends of sections 20D, respectively, are a pair of horizontal end or base sections 20E, each of which is about 2.5 cm long.

As shown in FIG. 1, the nested bent sections of plates 18 are supported by upwardly pointed center portions 20C. The main portions of each plate rest upon the bent corner joining sections 20U and 20H so that the plates each extend up at an angle of about 24° from the horizontal.

OPERATION

In operation the wire stand and the plates are arranged as in FIG. 1 by simply placing the stand (FIG. 2) over the burner and onto the floor of the barbecue as in FIGS. 1 and 3. The stand is sized so that when it is centered over the burner, its legs will be spaced from the sides-and its support sections will be spaced from the top-of most burners. Then the plates are placed over the stand in the anticline, overlapping arrangement, as shown in FIG. 1. The stand supports the plates in this desirable position even though the barbecue does not have any rock grate.

The burner is then lit and food (not shown) is placed upon cooking grid 16 where the heat from the flames (not shown) extending up from the periphery of burner 12 cooks such food. In the course of cooking, liquid (not shown) drips from such food and falls onto plates 18L and 18R. Since the flames will heat such plates are heated to a very hot temperature (about 450°/842° F.), most of the drippings will vaporize to smoke (not shown) which will rise and envelop and impart a rapid, smoky flavor to the food. Some of the drippings will not vaporize instantly, and so will flow down the plates where they will be further heated and vaporize to create additional smoke. Any drippings that do not vaporize during such flow down will collect in the troughs created by bent-up sections 18B at the outer, lower edges of the plates, where they will get a third chance to vaporize, or will collect without vaporizing.

After cooking, the plates and stand are allowed to cool (about 30 minutes) whereupon they simply can be lifted off the stand and cleaned. The stand can be left in place or lifted directly off and cleaned if necessary.

SUMMARY, RAMIFICATIONS, AND SCOPE

Accordingly the reader will see that, according to the invention, I have provided an improved way to generate smoke in a barbecue using a sloping smoke generating plate arrangement which is improved in design and operation, which is not susceptible to flareup, which can be mounted in a barbecue which does not have any rock grate, which is simple in construction, easy to assemble, disassemble, and clean, and which is reliable in operation and use.

While the above description contains many specificities, these should not be construed as limitations on the scope of the invention, but as exemplifications of the presently preferred embodiments thereof. Many other ramifications and variations are possible within the teachings of the invention.

For example, in lieu of a wire stand, the stand can be made of a bent foraminous plate of sheet metal, a bent strip of metal, several bent plates and strips (one at each end of the burner, either connected or separate), rods or strips of ceramic material, etc. The burner can have many other shapes than as shown, as can the plates. The stand and the plates can be made integral. The stand can be supported by supports extending from the ends of the barbecue housing. The plates or plate arrangement can be formed in one angled or bent piece or two hinged pieces, or can even comprise a single sloping, pitched member (rather than an anticline). The stand can be attached to the floor of the barbecue in a cantilever manner on one side of the burner.

Thus the scope of the invention should be determined by the appended claims and their legal equivalents, and not by the examples given.

We claim:

1. A barbecue, comprising:

a housing having a floor, a burner in said housing, said burner having a predetermined height and being mounted above said floor, a food-holding grill above said burner, a stand supporting a smoke-generating plate arrangement between said burner and said grill, said stand comprising a base portion on at least one side of said burner for supporting said stand on said floor, a leg portion extending up from said base portion on said side of said burner to a first height above said predetermined height, said leg portion having an upper part, a support portion extending from said upper part of said leg portion over said burner, said support portion adjoining said leg portion to form a shoulder projecting portion at said predetermined height, said support portion having a top projecting portion above said burner at a second height above said first height, whereby said smoke-generating plate arrangement can be positioned in a sloping manner on said shoulder projecting portion and said top projecting portion.

2. The barbecue of claim 1 wherein said stand is made of wire.

3. The barbecue of claim 1 wherein said base portion comprises two parts positioned on respective sides of said burner, at least two leg portions extend up from said base portion on said respective sides of said burner, said support portion is connected between said two leg portions to form two shoulder projecting portions, whereby said smoke-generating plate arrangement can be positioned in an anticline manner on said shoulder projecting portions and said top projecting portion.

4. The barbecue of claim 1 wherein said stand is made of wire.

5. The barbecue of claim 1 wherein said base portion comprises an elongated member extending along said floor, said leg portion extends up from one end of said elongated member, said stand includes another similar leg portion extends up from another end of said elongated member, another similar support portion extending from said upper part of said other leg portion parallel to said first-recited support portion to form another shoulder projecting portion at said predetermined height, and a pair of additional leg portions extending down to said floor from said support portions, respectively, on an opposite side of said burner, said pair of additional leg portions forming two additional shoulder projecting portions at said predetermined height on said opposite side of said burner.

6. The barbecue of claim 5 wherein said stand is made of wire.

7. The barbecue of claim 5 wherein each of said additional leg portions has a bottom end, and further including a pair of additional base portions extending from said bottom ends of said additional leg portions, respectively.

8. The barbecue of claim 1 wherein said support portion comprises an elongated horizontal member having an upwardly projecting center portion.

9. The barbecue of claim 8 wherein said stand is made of wire.

10. A barbecue, comprising:

a housing having a floor, a burner in said housing, said burner having a predetermined height and being mounted above said floor, a food-holding grill above said burner, a smoke-generating plate arrangement between said burner and said grill, said smoke-generating plate arrangement comprising at least one sloping plate arranged to catch drippings falling from food cooking on said grill, stand means for supporting said smoke-generating plate arrangement between said burner and said grill, said stand means being arranged to rest upon said floor of said housing and extend over said burner so as to be able to support said smoke-generating plate arrangement.

11. The barbecue of claim 10 wherein said stand means is made of wire.

12. The barbecue of claim 10 wherein said stand means comprises a base portion on at least one side of said burner for supporting said stand on said floor, a leg portion extending up from said base portion on said side of said burner to a first height above said predetermined height, said leg portion having an upper part, and a support portion extending from said upper part of said leg portion over said burner, said support portion adjoining said leg portion to form a shoulder projecting portion at said predetermined height, said support portion having a top projecting portion above said burner at a second height above said first height, 13. The barbecue of claim 12 wherein said base portion comprises two parts positioned on respective sides of said burner, at least two leg portions extend up from said base portion on said respective sides of said burner, said support portion is connected between said two leg portions to form two shoulder projecting portions, whereby said smoke-generating plate arrangement can be positioned in an anticline manner on said shoulder projecting portions and said top projecting portion.

14. The barbecue of claim 12 wherein said stand is made of wire.

15. The barbecue of claim 12 wherein said base portion comprises an elongated member extending along said floor, said leg portion extends up from one end of said elongated member, said stand includes another similar leg portion extends up from another end of said elongated member, another similar support portion extending from said upper part of said other leg portion parallel to said first-recited support portion to form another shoulder projecting portion at said predetermined height, and a pair of additional leg portions extending down to said floor from said support portions, respectively, on an opposite side of said burner, said pair of additional leg portions forming two additional shoulder projecting portions at said predetermined height on said opposite side of said burner.

16. The barbecue of claim 15 wherein said stand is made of wire.

17. The barbecue of claim 15 wherein each of said additional leg portions has a bottom end, and further including a pair of additional base portions extending from said bottom ends of said additional leg portions, respectively.

18. The barbecue of claim 12 wherein said support portion comprises an elongated horizontal member having an upwardly projecting center portion.

19. The barbecue of claim 18 wherein said stand is made of wire.

20. A barbecue, comprising:

a housing having a floor, a burner in said housing, said burner having a predetermined height and being mounted above said floor, a food-holding grill above said burner, a stand supporting a smoke-generating plate arrangement between said burner and said grill, said stand comprising a base portion comprising an elongated member extending along said floor on one side of said burner for supporting said stand on said floor, a first pair of leg portions extending up from opposite sides of said base portion to a first height above said predetermined height, said leg portions each having an upper part, a pair of support portions extending from said respective upper parts of said leg portions over said burner, said support portions adjoining said leg portions to form a first pair of shoulder projecting portions on one side of said burner at said predetermined height, said support portions having a respective pair of top projecting portions above said burner at a second height above said first height, a pair of additional leg portions extending down to said floor from said support portions, respectively, on an opposite side of said burner, whereby said smoke-generating plate arrangement can be positioned in an anticline manner on said shoulder projecting portions and said top projecting portions.

* * * * *

UNITED STATES PATENT AND TRADEMARK OFFICE
CERTIFICATE OF CORRECTION

PATENT NO. : 5, 551,332
DATED : Sep 3, 1996
INVENTOR(S) : Theodore J. Beatty

It is certified that error appears in the above-indentified patent and that said Letters Patent is hereby corrected as shown below:

Col. 4, line 24, change "450°" to —450°C—.
Col. 4, line 26, change "rapid" to —sapid—.

Signed and Sealed this

Twenty-eighth Day of October, 1997

*Attest:*

BRUCE LEHMAN

*Attesting Officer*     Commissioner of Patents and Trademarks